(12) United States Patent
Marvin et al.

(10) Patent No.: US 11,067,700 B2
(45) Date of Patent: Jul. 20, 2021

(54) REMOVABLY ATTACHABLE GPS MODULE FOR A PORTABLE LOCATOR

(71) Applicant: Merlin Technology, Inc., Kent, WA (US)

(72) Inventors: Mark Marvin, Tacoma, WA (US); Brian Kelly, Sumner, WA (US)

(73) Assignee: Merlin Technology, Inc., Kent, WA (US)

( * ) Notice: Subject to any disclaimer, the term of this patent is extended or adjusted under 35 U.S.C. 154(b) by 195 days.

(21) Appl. No.: 16/114,189

(22) Filed: Aug. 27, 2018

(65) Prior Publication Data

US 2018/0364362 A1    Dec. 20, 2018

Related U.S. Application Data

(63) Continuation-in-part of application No. 29/584,050, filed on Nov. 10, 2016, now Pat. No. Des. 827,466.

(51) Int. Cl.
| | |
|---|---|
| *G01S 19/14* | (2010.01) |
| *G01S 19/35* | (2010.01) |
| *G08B 5/36* | (2006.01) |
| *H01Q 1/22* | (2006.01) |

(52) U.S. Cl.
CPC ............. *G01S 19/14* (2013.01); *G01S 19/35* (2013.01); *G08B 5/36* (2013.01); *H01Q 1/22* (2013.01)

(58) Field of Classification Search
CPC ............ G01S 19/14; G01S 19/35; G08B 5/36
USPC ........................................ 342/357.52, 357.75
See application file for complete search history.

(56) References Cited

U.S. PATENT DOCUMENTS

| | | | | |
|---|---|---|---|---|
| 6,501,429 B2* | 12/2002 | Nakamura | .............. | G01S 19/34 343/702 |
| 6,563,458 B2* | 5/2003 | Aizawa | ................... | G01S 19/36 342/357.76 |
| 7,089,780 B2* | 8/2006 | Sunshine | ............. | G01N 29/022 340/541 |
| 7,136,765 B2* | 11/2006 | Maier | ...................... | G01V 3/12 702/65 |
| 7,228,112 B2* | 6/2007 | Ota | ........................ | H01Q 1/243 342/352 |
| 7,443,154 B1* | 10/2008 | Merewether | ........... | G01V 3/104 324/67 |
| 7,602,302 B2* | 10/2009 | Hokuf | .................. | A01K 11/008 340/539.13 |
| 7,773,038 B2* | 8/2010 | Degner | .................. | H01Q 1/244 343/702 |

(Continued)

OTHER PUBLICATIONS

Screenshots taken from URL (https://www.youtube.com/watch?v=_uF2C-tVob0) of the DrillMaps IRIS, published on Nov. 18, 2017.

*Primary Examiner* — Chuong P Nguyen
(74) *Attorney, Agent, or Firm* — Pritzkau Patent Group LLC

(57) ABSTRACT

A portable locator includes a locator housing having a display head that supports a display. A GPS module includes a frame and an antenna arm extending from a side margin of the frame. The frame defines a display aperture such that the frame is removably installable on the display head of the portable locator with the display visible through the display aperture. An electrical interface provides for electrical communication with the portable locator with the frame removably installed thereon.

6 Claims, 5 Drawing Sheets

(56) References Cited

U.S. PATENT DOCUMENTS

| | | | |
|---|---|---|---|
| 7,902,990 B2 * | 3/2011 | Delmonico | H02J 7/0047 |
| | | | 340/636.1 |
| 8,189,043 B2 * | 5/2012 | Schneider | H04N 7/183 |
| | | | 348/82 |
| D699,604 S * | 2/2014 | Dunkin | D10/47 |
| 8,729,901 B2 | 5/2014 | Lam et al. | |
| 9,465,129 B1 * | 10/2016 | Olsson | G01V 3/15 |
| 9,891,337 B2 * | 2/2018 | Olsson | G01V 3/081 |
| 10,571,594 B2 * | 2/2020 | Olsson | G01S 19/51 |
| 2002/0021244 A1 * | 2/2002 | Aizawa | G01S 19/36 |
| | | | 342/357.76 |

* cited by examiner

REMOVABLY ATTACHABLE GPS MODULE FOR A PORTABLE LOCATOR

RELATED APPLICATION

The present application is a continuation-in-part of U.S. Design application Ser. No. 29/584,050, filed on Nov. 10, 2016, the entire contents of which are hereby incorporated by reference.

BACKGROUND

The present application is at least generally related to the field of a portable locator and, more particularly, to a removably attachable GPS module for such a portable locator.

As more utilities are installed underground, the need to record the location of these installations for future reference has grown in importance. Many public utilities and private companies that install underground utilities or other assets now require documentation of these underground installations, including the position. The electronic locating systems used in connection with these underground installations are the primary means for recording data about these installations. Some locating systems already have integrated GPS (Global Positioning System) capabilities for purposes of making position determinations. One example can be seen in U.S. Pat. No. 8,729,901, issued to Lam, et al. (hereinafter Lam), which is commonly owned with the present Application and is hereby incorporated by reference.

Applicant, however, recognizes that there are opportunities to improve upon the few locating systems that already include GPS capability, as will be brought to light in the present Application.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Applicant recognizes that the ability of a GPS receiver to receive signals from a sufficient number of GPS satellites to achieve an accurate GPS reading in a timely manner is a significant performance issue for locating systems because satellites are not always visible depending on the location of the underground drilling jobsite. Placement and design of the GPS antenna can improve the ability to receive signals from GPS satellites, as well as minimize the possibility of interference with elements of the locating system. Applicant also recognizes that a more flexible design can also help support easier and more cost effective replacement of the GPS antenna when required, and to omit the GPS antenna when not desired (which helps reduce the cost of producing the locating system for users who do not desire the GPS functionality).

Generally, a GPS module and associated methods are described for use with a portable locator as part of an inground locating system. The portable locator includes a locator housing having a display head that supports a display. In an embodiment, the GPS module includes a frame and an antenna arm extending from a side margin of the frame, and the frame defines a display aperture such that the frame is removably installable on the display head of the portable locator with the display visible through the display aperture. An electrical interface provides for electrical communication with the portable locator with the frame removably installed thereon. In one feature, the antenna arm can define a cavity for receiving a GPS antenna.

BRIEF DESCRIPTIONS OF THE DRAWINGS

Exemplary embodiments are illustrated in referenced figures of the drawings. It is intended that the embodiments and figures disclosed herein are to be illustrative rather than limiting.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, upper/lower, right/left and the like may be adopted for purposes of enhancing the reader's understanding, with respect to the various views provided in the figures, and is in no way intended as being limiting.

Figure 1:
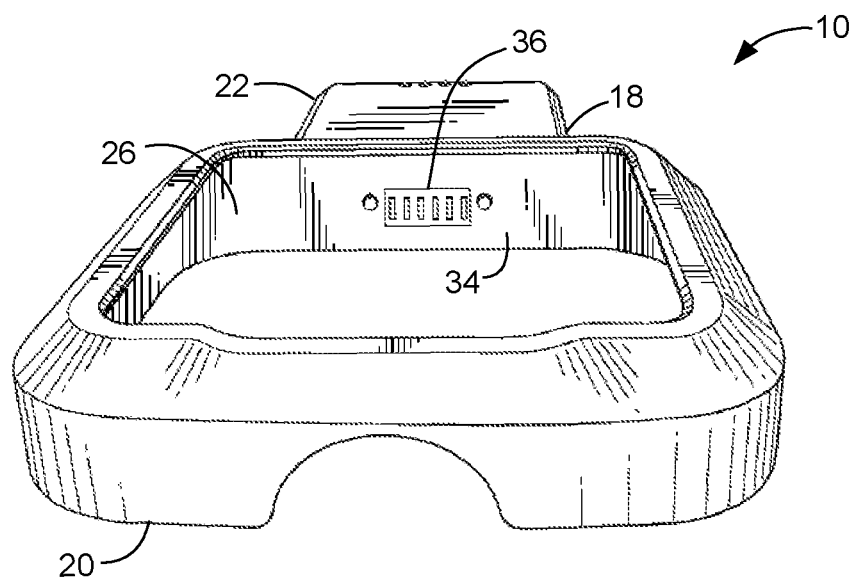
FIG. 1 is a perspective view of the top of the removably attachable GPS module, taken generally from the rear.
Figure 2:
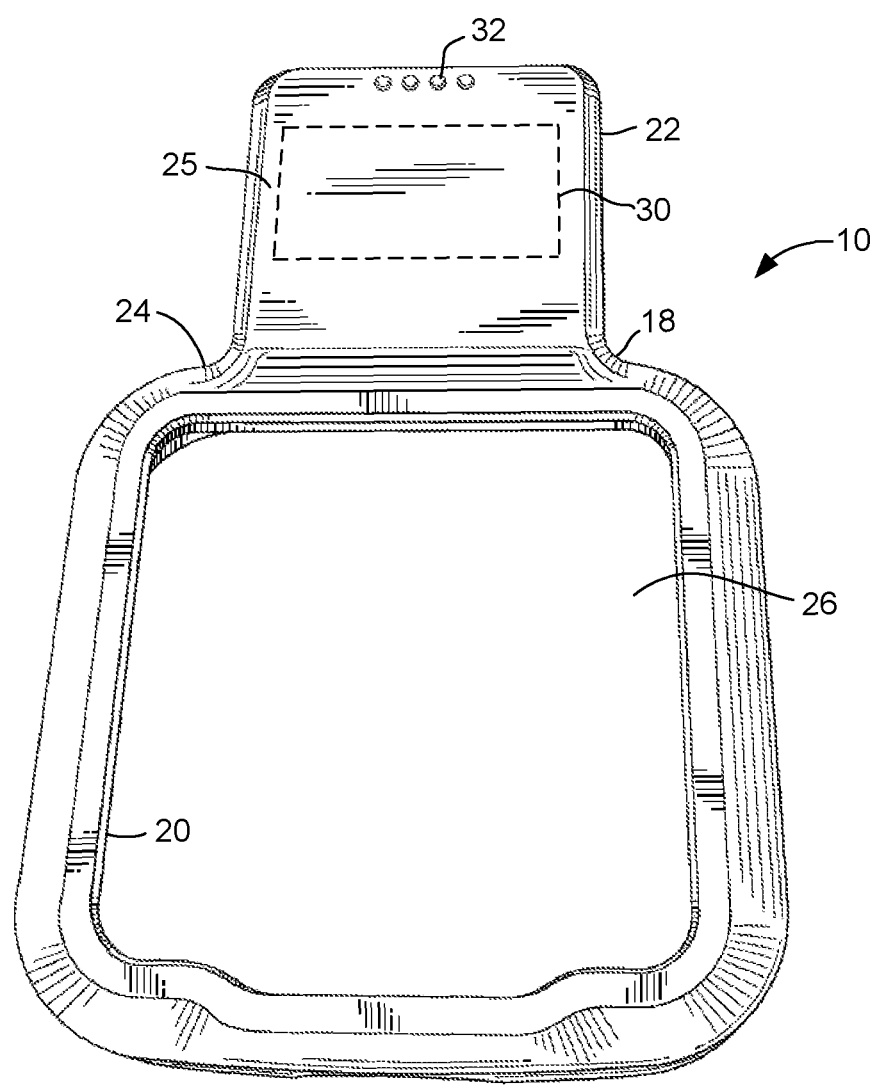
FIG. 2 is a top perspective view thereof, taken generally from the rear.
Figure 3:
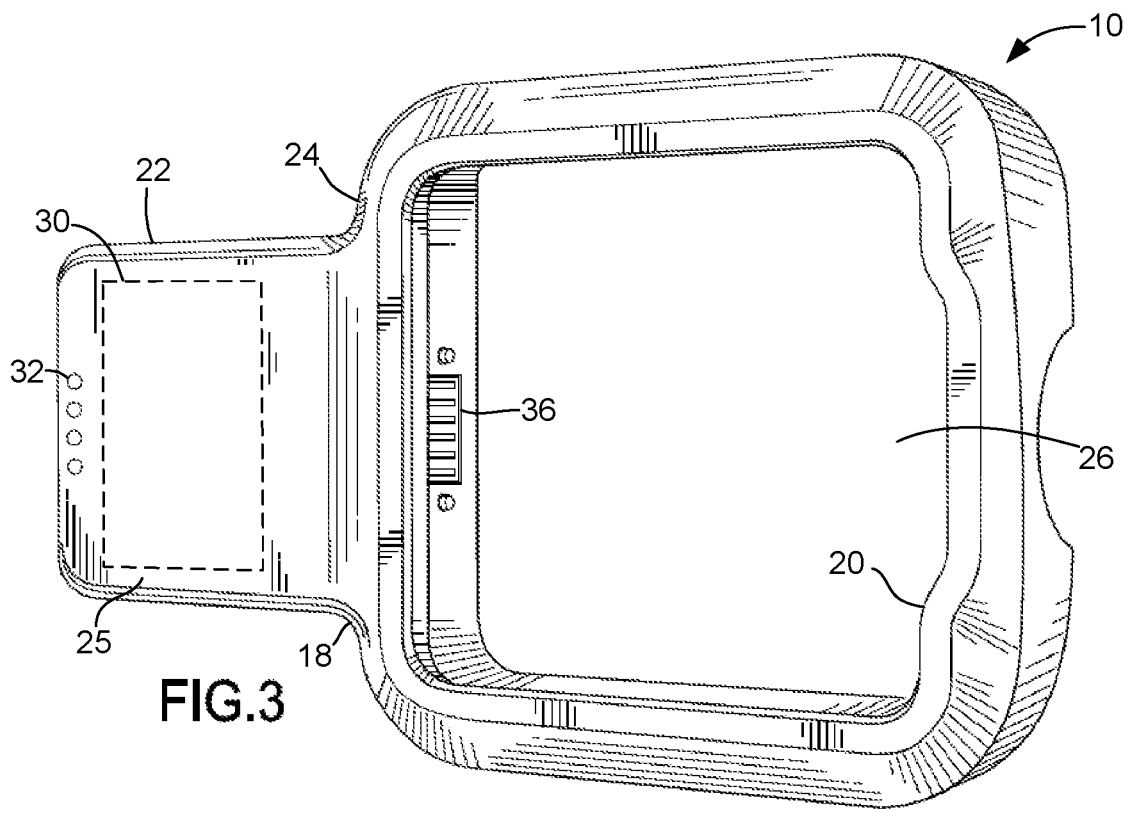
FIG. 3 is a top perspective view thereof, taken generally from the rear and to one side.
Figure 4:
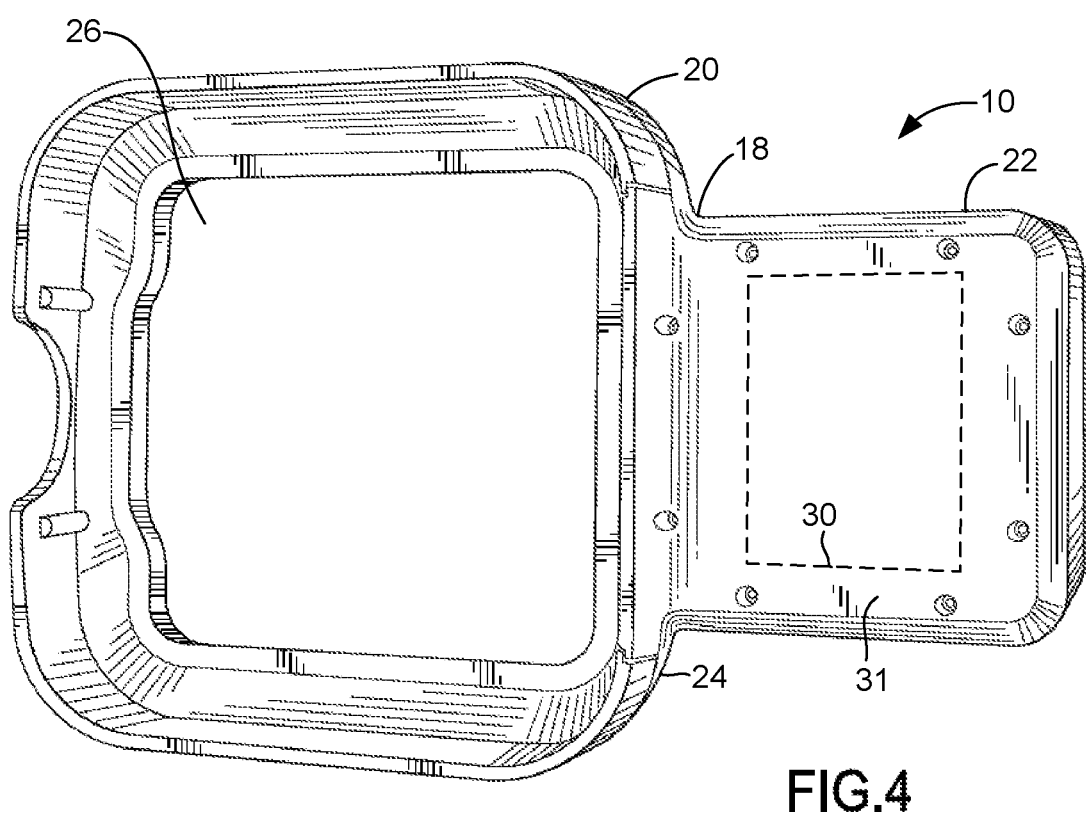
FIG. 4 is a bottom perspective view thereof, taken generally from the side above and toward the front.

Turning now to the drawings, wherein like items may be indicated by like reference numbers throughout the various figures, attention is immediately directed to FIGS. 1-4, which illustrate one embodiment of a GPS module, generally indicated by the reference number 10, that is configured to removably engage a portable locator, as will be seen in subsequent figures. The portable locator serves as part of an inground locating system, as described in the above incorporated Lam patent. GPS module 10 includes a housing 18 having a frame 20 and an antenna arm 22 extending from a side margin 24 of frame 20. In the present embodiment, frame 20 and an upper portion 25 of the antenna arm are integrally formed. The frame defines a display aperture 26 which will be described in detail at an appropriate point hereinafter. Upper portion 25 of the antenna arm partially defines a cavity that receives a GPS antenna 30 which is diagrammatically shown, in phantom, as a dashed rectangle (FIGS. 2-4) and which is closed by a cover 31 (FIG. 4). One example of a GPS antenna is shown in the Lam patent. A plurality of LED indicators 32 such as, for example, four LEDs (seen in FIGS. 2, 3, 6 and 7) indicate the relative accuracy of a current positional determination based on the number of satellites currently being received. As seen in FIG. 1, an inner forward wall 34 of frame 20 supports an electrical connector 36, the purpose of which is yet to be described.

Figure 5:
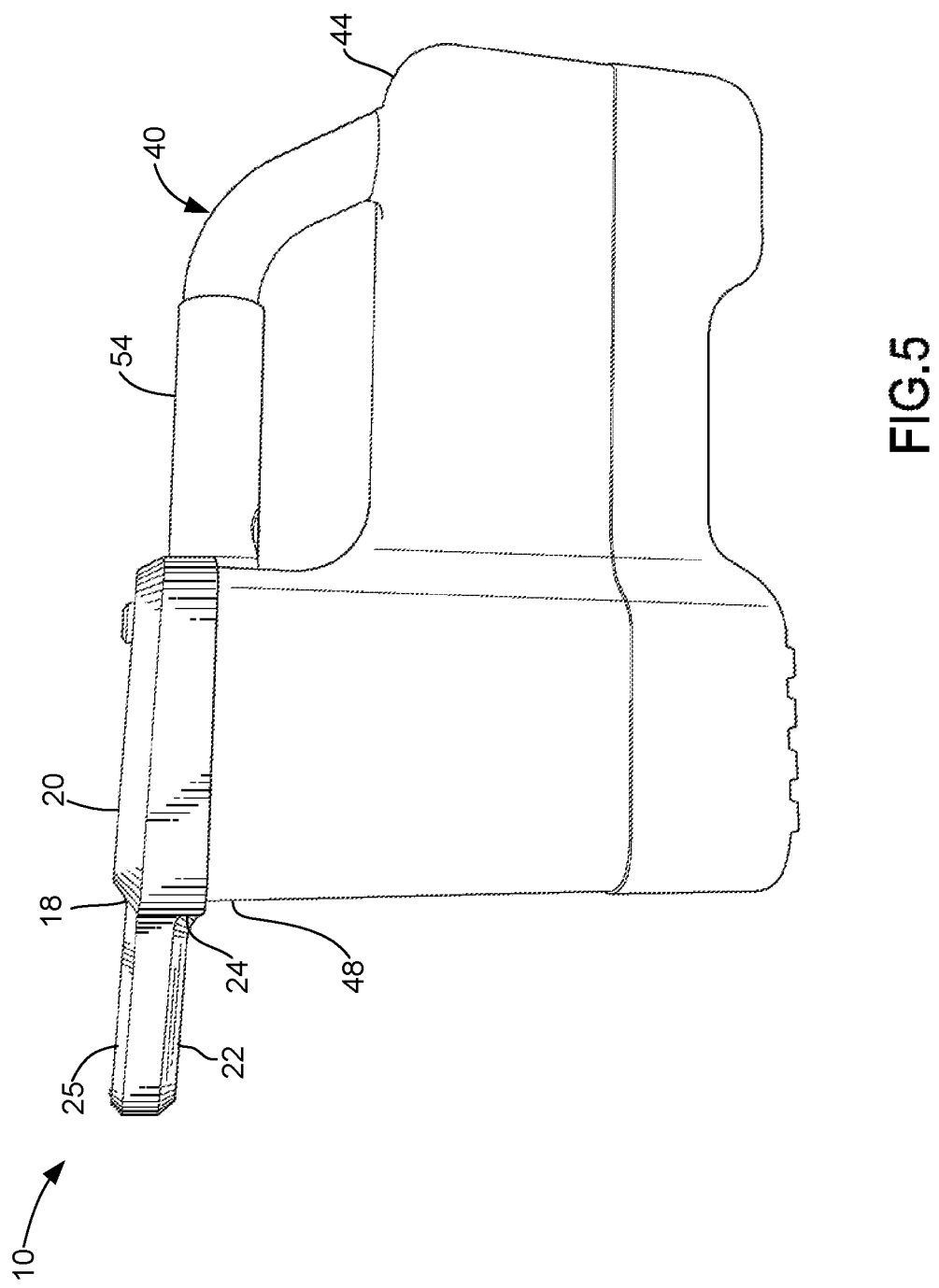
FIG. 5 is a top perspective view a left side view, in elevation, showing the GPS module installed on a portable locator, the right side elevational view is a mirror image of the left side.
Figure 6:
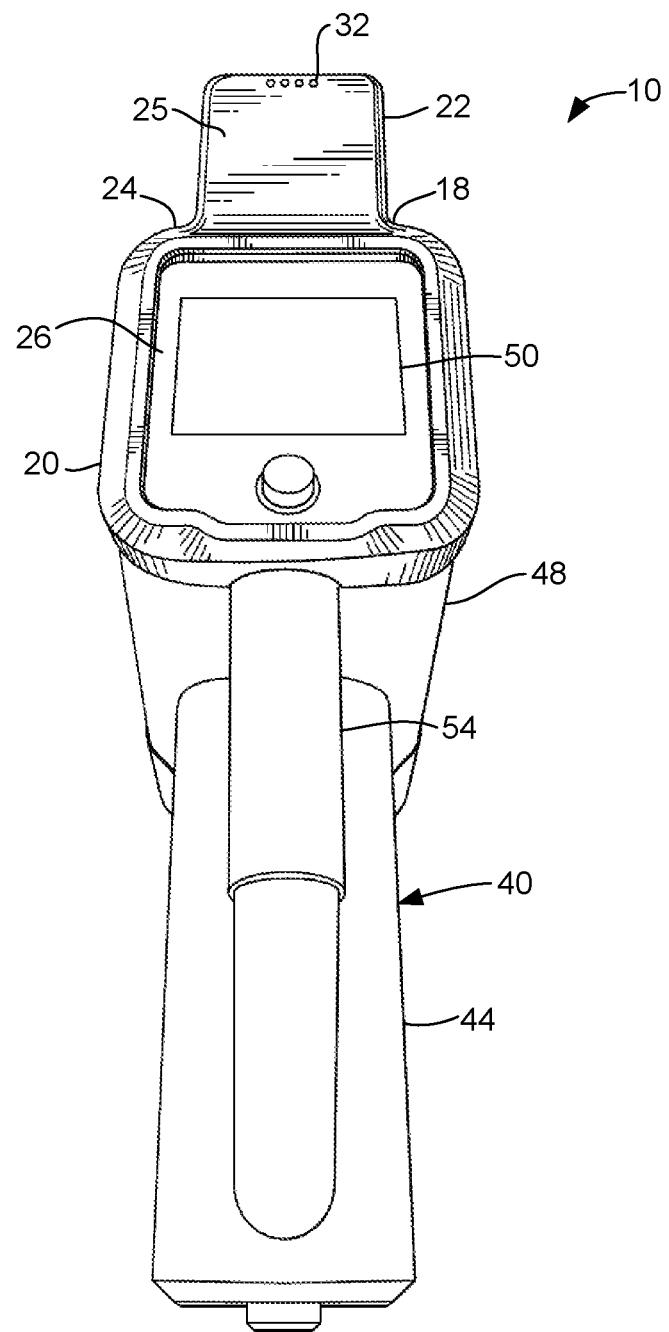
FIG. 6 is a top perspective view, taken generally from the side above and to the rear, showing the GPS module installed on the portable locator.
Figure 7:
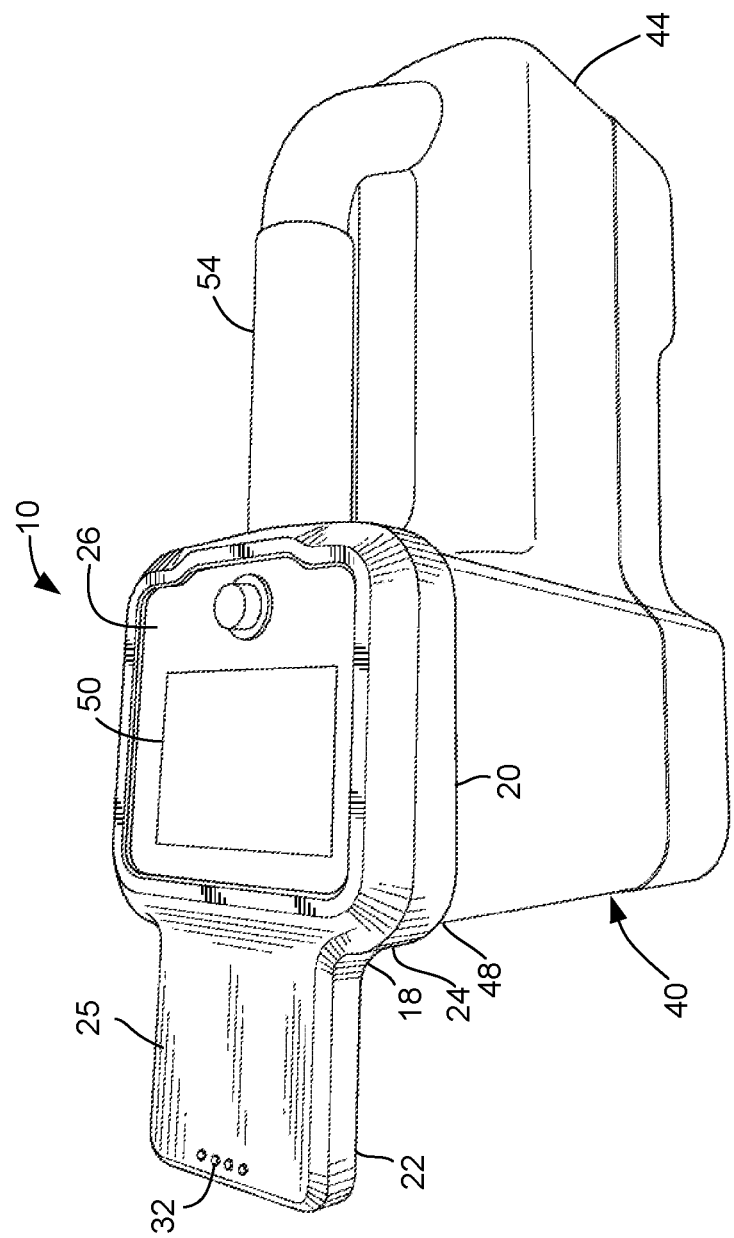
FIG. 7 is a top view, in perspective, again taken generally from the side, showing the GPS module installed on the portable locator.

FIGS. 5-7 illustrate GPS module 10 removably installed on a portable walkover locator 40. In an embodiment, locator 40 can be a DigiTrak Falcon F5® brand locator produced by Digital Control, Inc. of Kent, Wash. The locator includes a locator housing 44 having a display head 48 that supports a display 50 that is shown in FIGS. 6 and 7. A handle 54 is configured for user engagement to carry the portable locator. Frame 20 includes an inner periphery that is complementary to the outer upper peripheral shape of display head 48 such that the frame can be removably snapped onto the display head. When frame 20 is received on display head 48, display 50 is visible through display aperture 26 of frame 20. At the same time, GPS module 10 is in electrical communication with locator 40 via electrical connector 36 and a complementary electrical connector supported on display head 48. It is noted that the display head and frame can include any suitable complementary shape and is not limited to the illustrated embodiment.

Applicants recognize that positioning the GPS module to extend forward and ahead of the portable locator lends a clearer view of the sky and enhances the potential to receive signals from the greatest number of GPS satellites in a timely manner. The separation achieved between the GPS antenna and the circuitry of the portable locator can also help minimize interference.

Although each of the aforedescribed physical embodiments have been illustrated with various components having particular respective orientations, it should be understood that the present invention may take on a variety of specific configurations with the various components being located in a wide variety of positions and mutual orientations. Accordingly, having described a number of exemplary aspects and embodiments above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A GPS module for use with a portable locator as part of an inground locating system, the portable locator including a locator housing having a display head that supports a display, said GPS module comprising:
    a frame having an antenna arm extending from a side margin thereof and the frame defines a display aperture such that the frame is removably installable on the display head of the portable locator with the display visible through the display aperture; and
    an electrical interface for electrical communication with the portable locator with the frame removably installed thereon.

2. The GPS module of claim 1 wherein the side margin of the frame is a forward side margin such that the antenna arm is positioned ahead of the locator.

3. The GPS module of claim 1 wherein the antenna arm supports at least one indicator LED.

4. The GPS module of claim 1 wherein an interior periphery of the frame supports an electrical connector for electrical communication with the portable locator when the GPS module is removably installed thereon.

5. The GPS module of claim 1 wherein the frame and a portion of the antenna arm are integrally formed.

6. The GPS module of claim 5 wherein the antenna arm further comprises a cover that is receivable by said portion of the antenna arm such that the portion of the antenna arm and the cover cooperate to define a cavity for receiving a GPS antenna.

* * * * *